Oct. 29, 1935. W. F. REACH 2,018,897
GOLF CLUB
Filed March 31, 1932
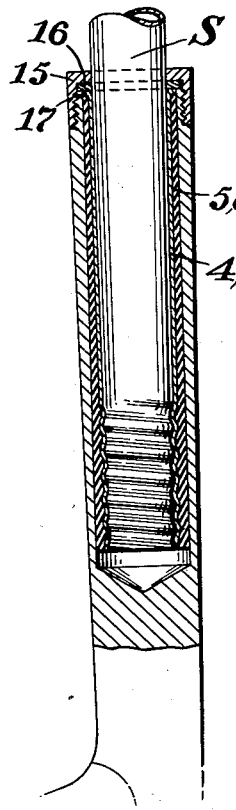
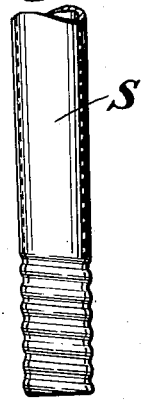
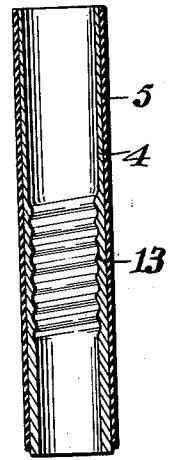
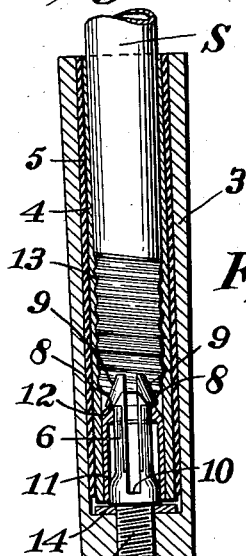
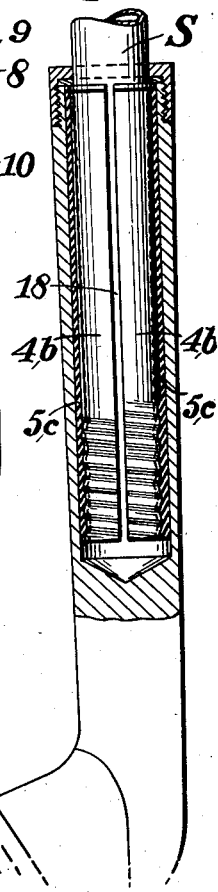
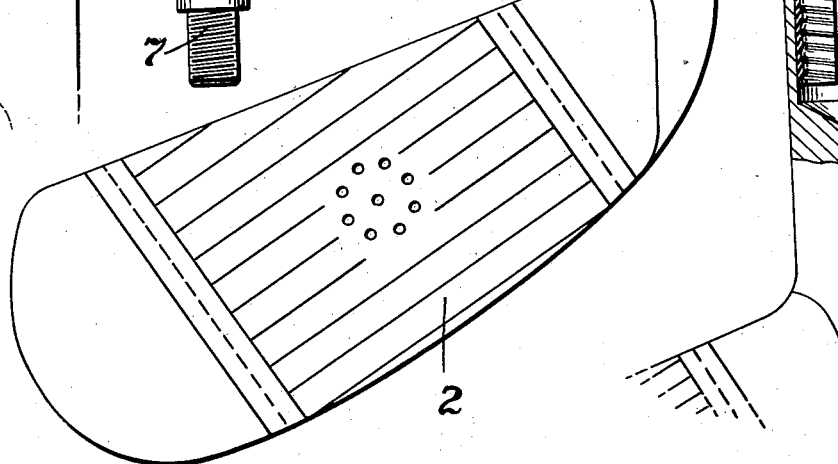
Inventor:
William F. Reach,
By Spear Donaldson & Hall
Attorneys.

Patented Oct. 29, 1935

2,018,897

UNITED STATES PATENT OFFICE 2,018,897

GOLF CLUB

William F. Reach, Springfield, Mass., assignor to A. G. Spalding & Bros., New York, N. Y., a corporation of New Jersey Application March 31, 1932, Serial No. 602,277

25 Claims. (Cl. 273—80)

The invention relates to that type of golf club which has a rubber sleeve within the hosel to provide a torsionally resilient connection between the shaft and the head of the club.

One feature of the invention concerns a rigid sleeve held in the hosel with the rubber sleeve interposed between it and the hosel to provide for torsional or transverse resiliency and a connection between said shaft and said sleeve so that the shaft can be removed or replaced while the sleeve remains in place, said shaft fitting within the rigid sleeve of metal or the like and having such a connection with said sleeve as will enable detachment and replacement of the shaft to be accomplished.

Another object of the invention is to provide means whereby the rigid sleeve with the rubber sleeve fixed thereto on its outer side will be held in position within the hosel against longitudinal displacement so that the distortion of the rubber sleeve will not have the effect of backing out or displacing the metal sleeve and shaft in relation to the hosel.

The invention may be embodied in different forms.

In the drawing

Fig. 1 is a longitudinal sectional view of so much of a golf club as is necessary to illustrate the invention in one form.

Fig. 2 is a view of the metal sleeve with the rubber sleeve molded thereon.

Figs. 2a and 2b are details.

Fig. 3 is a similar view to Fig. 1 of another form of assembly embodying the invention.

Fig. 4 is a view in section of another form of the invention.

In the drawing and referring first to Fig. 1, the head of the club of substantially ordinary form is shown at 2 having a hosel 3. In this hosel a rigid sleeve 4 preferably of metal is inserted together with a sleeve of rubber 5 which is vulcanized onto the outside of the metal sleeve. The insertion of the metal sleeve with its attached rubber sleeve is so made that the rubber makes contact with the wall of the hosel of a driving fit degree of tightness and under such pressure that the rubber in effect has its outer surface substantially attached to the inner wall of the hosel by the strong frictional engagement between them. The metal sleeve may be held against longitudinal displacement in different ways. In Fig. 1 is shown a two prong spring catch 6 seated in the base portion of the hosel by a screw threaded shank 7 engaging a screw threaded socket in the body at the base of the hosel. The spring catch has two prongs each of which has a shoulder at 8 and an inclined face at 9. There is also a kerf 10 between the prongs by which the spring catch may be engaged by a suitable tool like a screw driver inserted through the upper end of the hosel for screwing the catch member into place or removing it when necessary.

The metallic sleeve at its lower end and within the same has attached thereto, as for instance by spot welding, a ferrule 11 presenting a shoulder 12 extending in an annular direction and this shoulder is adapted to be engaged by the shoulders 8 of the spring catch member so that the metal sleeve together with the rubber sleeve vulcanized thereon will be held in position against axial displacement which otherwise might occur owing to the rubber being under pressure and having the quality of distortion, but not compressibility. The metal sleeve has a screw thread 13 on its interior to receive the screw threaded lower end of the shaft. This shaft S is of metal tubing, having a downward taper, and the metal sleeve is formed with its bore to correspond, and confine the shaft therein.

Under the impact of the blow upon hitting the ball there will be a torsional strain exerted upon the joint between the shaft and hosel and this will be absorbed by the resilient rubber sleeve so that the shock will not be transmitted to the hands of the player. The resiliency of the rubber sleeve will allow this torsional action to take place and will restore the parts to normal position after the torsional action has taken place. The rubber sleeve also provides for absorbing shocks and strains exerted transversely to the axis of the shaft and hosel.

Should it be desired to renew a shaft or replace a broken shaft this can be done by unscrewing it from the metal sleeve and screwing into place within the sleeve a new shaft. This can be done without removing the metal sleeve and its attached rubber sleeve which will remain in place. A suitable washer 14 may be located between the body of the spring catch member and the bottom of the bore of the hosel.

In Fig. 3 a metallic sleeve 4a having a rubber sleeve 5a vulcanized thereto is held within the hosel by the driving fit contact between the rubber sleeve and the wall of the hosel. To prevent displacement of these parts axially in relation to the hosel a cap member 15 is screw threaded onto the exterior of the upper end of the hosel, said cap having an opening through which the shaft can be inserted into the metal sleeve. The sleeve is screw threaded at its lower end to receive the screw threaded lower end of the shaft. A washer 16 of rubber lies between the cap 15 and the flange 17 at the upper end of the metal sleeve and this washer also overlies the upper end of the hosel. The upper end of the rubber sleeve lies against the under side of the flange 17 of the metal sleeve. This cap member holds the metallic sleeve together with the rubber sleeve in place against any tendency for these parts to back out of the hosel due to the distortion of the rubber of the resilient sleeve. In this form like in that first described the shaft fits against the inner wall of the metallic sleeve and torsional and transverse strains and shocks are absorbed by the rubber sleeve. The shaft can be removed and replaced as in the form first described, all other parts remaining in normal position.

The structures above described will permit renewal of a shaft in case of breakage without necessitating the return of the club to the factory. The metallic sleeve may be tapered to conform to the taper of the shaft. The rubber sleeve in this event will be gradually thicker towards its lower end.

In Fig. 4 is shown another form of the invention in which the metallic sleeve 4b is made in longitudinal sections, the space between the sections being indicated at 18. The rubber is vulcanized to these sections. The tapered shaft when screwed into the sleeve sections has a wedging action thereon forcing them outwardly and causing the rubber to engage the hosel under strong frictional contact sufficient to hold the sleeves in place and thus connect the shaft firmly with the hosel. This frictional contact is substantially like that derived from forcing the sleeves of the forms first described together with their attached rubber sleeve into the hosel. In other words the degree of tightness of the fit is derived by force exerted upon the rubber sleeve and setting it in strong frictional engagement with the hosel wall. The same torsional action is secured as in the forms before described. The rubber is in the form of sections 5c one of which is vulcanized to each sleeve section.

The same cap member may be employed screwed onto the hosel and a rubber washer may be employed bearing on the end of the hosel and the flange of the sleeve.

In this form of the invention the divided rigid sleeve with the attached rubber may be dropped into the hosel and then by screwing the shaft into place the frictional contact of the desired degree of driving fit tightness may be secured by the wedging action of the shaft forcing the sleeve sections apart.

While I have shown the invention in connection with an iron club, the scope thereof, as set out in the accompanying claims, is not limited to this character of club, but features of the invention may be employed in connection with wooden head clubs.

The term "sleeve of rigid material" as used in the appended claims in a generic sense except as otherwise modified includes the one piece sleeve of Figs. 1–3, or the divided sleeve of Fig. 4. In both forms the rigidity of the material of which the sleeve is composed will prevent the backing out tendency of the parts from the hosel under the action of the distortable rubber under compressive force. In both forms the rigidity of the sleeve in a lengthwise direction lends itself to the use of holding means connecting it with the hosel to resist lengthwise displacement of the parts and of the rubber sleeve, and in both forms the sleeve is held so as to have rotative action, relative to the hosel.

I claim:

1. A golf club having a hosel, a sleeve of rigid material therein, split lengthwise, rubber torsional means between the sections of the sleeve of rigid material and the hosel wall and a shaft adapted to be inserted and held within the sectional sleeve and to spread said sections to firmly seat the rubber against the wall of the hosel, and means on the hosel for holding the sleeve of rigid material against longitudinal movement while allowing its expansion and rotative action substantially as described.

2. A glof club according to claim 1 in which the rubber cushion means is affixed to the sections of the sleeve of rigid material.

3. A golf club according to claim 1 in which the shaft is tapered and screw threaded to fit a correspondingly tapered and screw threaded portion of the split sleeve to spread the sections thereof.

4. A golf club having a hosel, a sleeve of rigid material therein, a torsion sleeve under pressure between the sleeve of rigid material and the hosel, said torsional sleeve extending substantially to the top of the first named sleeve, a shaft detachably connected with the latter, and means independent of the torsional sleeve for holding the sleeve of rigid material against axial displacement within the hosel, while allowing it to yield circumferentially, substantially as described.

5. A golf club according to claim 4 in which the sleeve of rigid material has a flange at its outer end overlying the upper edge of the torsion sleeve.

6. A golf club head and hosel assembly, apart from the shaft, comprising a rigid shaft socket member located within the hosel coaxially of the same and provided with means for detachably engaging the shaft of the club, means for preventing accidental displacement of the socket member lengthwise of the hosel and for permitting rotative movement thereof, and a member integral with the socket member and engaging the hosel for renitently retarding rotation of the socket member in the hosel.

7. A golf club head and hosel assembly, apart from the shaft, comprising a rigid shaft socket member located within the hosel coaxially of the same and provided with means for detachably engaging the shaft of the club, means for preventing accidental displacement of the socket member lengthwise of the hosel and for permitting rotative movement thereof, and a member carried by the socket member and engaging the hosel for renitently retarding rotation of the socket member in the hosel.

8. In a golf club, a self-contained head assembly and a shaft readily removable therefrom, said assembly comprising a hosel, a tubular metallic shaft socket member extending axially of the hosel and having a tapering portion and a threaded portion, a rubber sleeve vulcanized to the socket member and held thereby in compressive coaction with the hosel for renitently retarding rotative movement of the member in reference to the hosel, and means for preventing lengthwise movement of the socket member and for permitting rotative movement thereof in reference to the hosel, and a shaft having a threaded portion complemental to the threaded portion of the socket member and a tapering portion adapted to be drawn into wedging engagement with the tapered portion of said member by the interaction of the threaded portion of the shaft with the threaded part of said member.

9. In a golf club, a self-contained head assembly and a shaft readily removable therefrom, said assembly comprising a hosel, a tubular shaft socket member located axially of the hosel and having a tapering portion and a threaded portion, a rubber sleeve vulcanized to the socket member and held thereby in compressive coaction with the hosel for renitently retarding rotative movement of the member in reference to the hosel, and means carried by the hosel and engaging with the end portion of said member for preventing accidental axial and permitting rotative movement thereof.

10. In a golf club, a self-contained head assembly and a shaft readily removable therefrom, said assembly comprising a hosel, a tubular metallic shaft socket member extending axially of the hosel having a tapering portion and a threaded portion, a rubber sleeve vulcanized to the socket member and held thereby in compressive coaction with the hosel for renitently retarding rotative movement of the member in reference to the hosel, and means located at the bottom of the bore of the hosel for preventing accidental axial displacement of said member, said means being accessible through the shaft socket member for the detachment thereof.

11. In a golf club, a self-contained head assembly and a shaft readily removable therefrom, said assembly comprising a hosel, a tubular metallic shaft socket member having a tapering portion and a threaded portion, a rubber sleeve vulcanized to the socket member and held thereby in compressive coaction with the hosel for renitently retarding rotative movement of the member in reference to the hosel, and means associated with the hosel and engaging the lower part of said member for preventing accidental lengthwise and permitting rotative movement thereof, said means being accessible through the socket member for detaching the latter from the hosel.

12. In a golf club comprising a self-contained head assembly and a shaft readily attachable and detachable therefrom, said assembly comprising a head, a hosel of considerable length having a long axial bore, a sheet-metal tubular shaft socket member of practically the full length thereof located in the same with its upper end practically flush with the upper end of the hosel, said member having a tapering part and a threaded part, a rubber sleeve fixed to said member and covering a substantial portion of the exterior thereof, the internal diameter of the sleeve being such that it will be held in compressive contact with the wall of the bore of the hosel by the shaft socket member, and means accessible for manipulation through the latter, coacting with the hosel and member respectively, for holding the latter against accidental movement lengthwise of the bore of the hosel and for permitting it to have rotative movement therein, and a metal shaft having its lower part threaded for engagement with the threaded part of said member and another part tapering for engaging the tapering part of the member.

13. The combination with a golf club head having a hosel of a sleeve of rigid material in the hosel, means for preventing axial movement of the sleeve and permitting rotative movement thereof relative to the hosel, a shaft, means for effecting a readily separable rigid connection between the shaft and the sleeve, and a torsion member apart from the first named means interposed between the sleeve and the hosel.

14. The combination with a golf club head having a hosel of a sleeve of rigid material in the hosel, means for preventing axial movement of the sleeve and permitting rotative movement thereof relative to the hosel, said means having a threaded connection to the hosel, a shaft, means for effecting a readily separable rigid connection between the shaft and the sleeve, and a rubber member interposed between and renitently retarding rotative movement of the sleeve in reference to the hosel.

15. The combination with a golf club head having a hosel of a shaft socket member, means for preventing accidental displacement thereof in the hosel and permitting rotative movement of the same, a shaft, and a renitent member vulcanized to the shaft socket member and held thereby in compressive coaction with the hosel.

16. The combination with a golf club head having a hosel provided with a socket terminating at one end within the hosel of a sleeve providing a shaft socket member, said sleeve being located within the socket in the hosel, removable means at the bottom of the last named socket for retaining the sleeve against accidental displacement and permitting the rotation thereof, and a rubber sleeve independent of the last named means and carried peripherally of the shaft socket sleeve and held thereby in compressive coaction with the wall of the hosel socket.

17. A golf club according to claim 14 in which the sleeve has a shoulder engaging the rubber member.

18. A golf club according to claim 14 in which the sleeve has a flange at its outer end and the retaining means for the sleeve is a cap screwed on the hosel and overlying the flanged end of the sleeve.

19. A golf club according to claim 14 in which the means for preventing axial displacement of the sleeve is located at the bottom portion of the socket in the hosel.

20. A golf club according to claim 14 in which the retaining means for the sleeve is concealed by the shaft when in place and accessible for removal when the shaft is disconnected.

21. The combination with a golf club head having a hosel of a sleeve arranged in the socket of the hosel concentric to the wall thereof, and providing a shaft socket, interengaging surfaces on the shaft and sleeve for readily coupling and uncoupling the shaft and sleeve, means in the hosel concealed by the shaft when it is in place and accessible for removal on the removal of the shaft for preventing accidental displacement of the sleeve and permitting rotative movement thereof, and a renitent element vulcanized to the periphery of the sleeve and held by the latter in compressive coaction with the wall of the hosel socket.

22. A golf club head and hosel assembly comprising a rigid shaft socket member located within the hosel coaxially of the same and provided with means for detachably engaging the shaft, means for preventing accidental lengthwise displacement of the socket member and for permitting rotative movement thereof, and a renitent member vulcanized to the periphery of the socket member and engaging the wall of the hosel socket for renitently retarding rotation of the socket member in the hosel.

23. The combination with a golf club head and hosel and a shaft of a shaft socket member, interengaging parts on the shaft and member providing a readily detachable, rigid, connection therebetween, and means independent of the shaft and coacting with the hosel and member for retaining the latter against accidental displacement in the hosel and renitently retarding rotative movement thereof.

24. In a complete golf club head assembly apart from the shaft and in combination, a golf club head having a hosel provided with an axial socket opening out at one end through the upper end of the hosel and terminating at its opposite end within the hosel, a rotatable shaft socket member having means for effecting connection to the club shaft, means for preventing lengthwise displacement of the member in the socket and permitting turning thereof, and means integral with said member for renitently retarding such turning movement, the latter means being held under compression between the shaft socket member and the wall of the socket in the hosel.

25. As a part of means for effecting a connection between a golf club head and its shaft, a metallic sleeve having internal means for effecting a rigid coupling to the shaft, and a sleeve of rubber composition vulcanized to its periphery.

WILLIAM F. REACH